Patented Jan. 28, 1941

2,229,784

UNITED STATES PATENT OFFICE 2,229,784

P-NITROBENZENE SULPHONYL GUANIDINE AND PROCESS FOR MAKING IT

Philip Stanley Winnek, Riverside, Conn., assignor to American Cyanamid Company, New York, N. Y., a corporation of Maine No Drawing. Original application February 23, 1940, Serial No. 320,430. Divided and this application September 19, 1940, Serial No. 357,499

2 Claims. (Cl. 260—556)

The present invention relates to a new class of chemical compounds, namely the guanidine derivatives of p-benzene sulphonamide compounds, more particularly it relates to the compound represented by the following general formula:

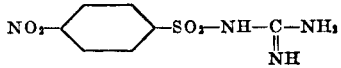

The compound of this invention is useful as an intermediate in the preparation of chemotherapeutic agents.

This is a divisional application of my copending application Serial No. 320,430 filed February 23, 1940, which matured into U. S. Patent 2,218,490 on October 15, 1940.

While the present invention is not limited to any particular method of preparing this compound, I have found that good yields of the p-nitrobenzene sulphonyl guanidine can be obtained by adding p-nitrobenzene sulphonyl chloride to an aqueous solution of guanidine and keeping the pH of the mixture slightly on the alkaline side by the addition of sodium hydroxide. After the reaction is complete, the p-nitrobenzene sulphonyl guanidine is separated by filtration and purified by crystallization from water.

p-Aminobenzene sulphonyl guanidine can be prepared by reducing the nitro compound.

The invention will be described in greater detail in connection with the following specific example. The parts are by weight except in the case of liquids which are expressed in corresponding parts by volume.

EXAMPLE

*p-Nitrobenzene sulphonyl guanidine*

Ten parts of guanidine hydrochloride (0.1 mol) was dissolved in 75 parts of water and the pH adjusted to 8–9. The solution was warmed to 50–60° C. and kept at this temperature while a slurry of 25 parts (0.113 mol) of p-nitrobenzene sulphonyl chloride was added slowly with mechanical stirring. The pH was kept at 8–9 by the addition of 40% sodium hydroxide solution. At the end of the reaction the solution was cooled and filtered from the separated solid. The p-nitrobenzene sulphonyl guanidine was recrystallized from hot water.

What I claim is:

1. The compound having the following formula:

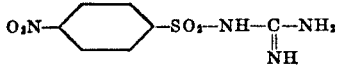

2. The process of producing the compound of the formula:

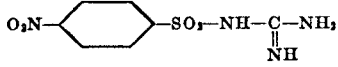

which comprises reacting guanidine with p-nitrobenzene sulphonyl chloride and separating the resulting product.

PHILIP STANLEY WINNEK.